US006156988A

United States Patent [19]

Baker

[11] Patent Number: 6,156,988

[45] Date of Patent: Dec. 5, 2000

[54] INTER-DEPARTMENTAL MAIL SORTING SYSTEM AND METHOD

[76] Inventor: Christopher A. Baker, P.O. Box 5625, Lafayette, Ind. 47903

[21] Appl. No.: 09/405,668

[22] Filed: Sep. 24, 1999

[51] Int. Cl.[7] ............................... B07C 5/00; G06K 9/00

[52] U.S. Cl. ........................... 209/584; 209/583; 209/900

[58] Field of Search .................................... 209/584, 583, 209/577, 900, 939; 235/375

[56] References Cited

U.S. PATENT DOCUMENTS

| | | | |
|---|---|---|---|
| 3,315,805 | 4/1967 | Brenner et al. | 209/111.8 |
| 3,774,758 | 11/1973 | Sternberg | 209/111.7 |
| 4,175,694 | 11/1979 | Donabin | 235/475 |
| 4,358,017 | 11/1982 | Erikson | 209/584 |
| 4,757,189 | 7/1988 | Daboub | 235/462 |
| 4,776,464 | 10/1988 | Miller et al. | 209/3.3 |
| 4,874,936 | 10/1989 | Chandler et al. | 235/494 |
| 4,921,107 | 5/1990 | Hofer | 209/546 |
| 5,009,321 | 4/1991 | Keough | 209/3.1 |
| 5,125,075 | 6/1992 | Goodale et al. | 395/200 |
| 5,158,183 | 10/1992 | Beerman et al. | 209/546 |
| 5,213,258 | 5/1993 | Kim | 229/305 |
| 5,298,731 | 3/1994 | Ett | 235/494 |
| 5,353,938 | 10/1994 | LaGrange et al. | 209/584 |
| 5,363,967 | 11/1994 | Tilles et al. | 209/539 |
| 5,427,252 | 6/1995 | Teegarden et al. | 209/540 |
| 5,518,122 | 5/1996 | Tilles et al. | 209/539 |
| 5,523,954 | 6/1996 | Weaver et al. | 364/478 |
| 5,607,063 | 3/1997 | Nishijima et al. | 209/584 |
| 5,684,705 | 11/1997 | Herbert | 364/464.11 |
| 5,697,504 | 12/1997 | Hiramatsu et al. | 209/546 |
| 5,703,783 | 12/1997 | Allen et al. | 364/478.01 |
| 5,758,574 | 6/1998 | Bernardo et al. | 101/2 |
| 5,770,841 | 6/1998 | Moed et al. | 235/375 |
| 5,790,429 | 8/1998 | Baker et al. | 364/565 |
| 5,862,243 | 1/1999 | Baker et al. | 382/101 |
| 5,866,888 | 2/1999 | Bravman et al. | 235/375 |
| 5,901,855 | 5/1999 | Uno et al. | 209/584 |
| 6,006,237 | 12/1999 | Frisbey | 707/104 |

FOREIGN PATENT DOCUMENTS

| | | |
|---|---|---|
| 2383083 | 6/1978 | France . |

*Primary Examiner*—Donald P. Walsh

*Assistant Examiner*—David A Jones

*Attorney, Agent, or Firm*—Woodard, Emhardt, Naughton Moriarty & McNett

[57] ABSTRACT

A processing system and apparatus for sorting and routing reusable mail pieces is shown. Each mail piece bears an identifier, which is stored in a database with the current intended destination of the mail piece to simplify subsequent sorting and routing operations. An envelope is shown that is suited for use in such a system. Computer readable media are shown that are executable to control such a system.

18 Claims, 5 Drawing Sheets

INTER-DEPARTMENTAL MAIL SORTING SYSTEM AND METHOD

BACKGROUND OF THE INVENTION

The present invention relates to mail processing techniques, and more particularly, but not exclusively, relates to sorting internal mail in a reusable envelope.

In large companies and organizations, documents and things are often sent from one individual or department to another via an inter-departmental mail system. Commonly, this type of system utilizes a reusable envelope that includes multiple address blocks. During each reuse, the newly entered addressee information is inspected to properly sort and route the mail piece. Sometimes sorting and routing is performed manually. In other instances, sorting and routing is performed with equipment using external mail processing techniques. Unfortunately, these external processing techniques generally fail to recognize the unique needs of internal mail systems, and may actually tend to increase the opportunities for error.

Thus, there is a demand for advancements in mail processing technology to address such limits and/or fulfill other mail processing needs.

SUMMARY OF THE INVENTION

One form of the present invention is a unique mail processing system. Other forms include a unique reusable envelope, and unique systems and methods for sorting mail. It should be noted that, as used in this description, "envelope," "mail," "mail piece," and "mail carrier" refer to any letter, parcel, or other matter which is intended to be processed in a mail delivery system. That system may employ more or less automation, as preferred by the implementing organization.

In another form of the present invention, a technique for mail processing includes the use of a plurality of mail pieces, each bearing an identifier specific to that envelope or parcel wrapping. As consecutive destinations are indicated on an envelope and are read by sorting equipment, the mail processing system maintains an association between the mail piece identifier (representing a specific mail piece) and the current destination for that mail piece, so that subsequent processing can be done more efficiently. When the mail piece is reused, a new association is created.

In another form, each mail piece identifier is provided as a bar code, smart device, or radio frequency ("RF") tag attached to each mail piece.

In another form, destination information is input directly from a computer or key pad.

In another form, each mail piece comprises a static, unique, machine-readable mail carrier identifier and a plurality of destination entry blocks. In another form, a computer readable medium is encoded with programming instructions that are executable to maintain a database of mail carrier identities and corresponding destination information, accept queries based on a mail carrier identity, and generate a response related to the current destination for that mail carrier.

In another form, an apparatus is encoded with programming instructions that are executable by a processor to determine a current desired destination for a mail piece, maintain a database relating an identifier for the mail piece to the current desired destination, and generate a sorting signal to direct a mail sorter to sort the mail piece.

Further forms, embodiments, objects, features, and advantages of the present invention shall become apparent from the detailed drawings and descriptions provided herein.

DESCRIPTION OF THE PREFERRED EMBODIMENTS

Figure 1:
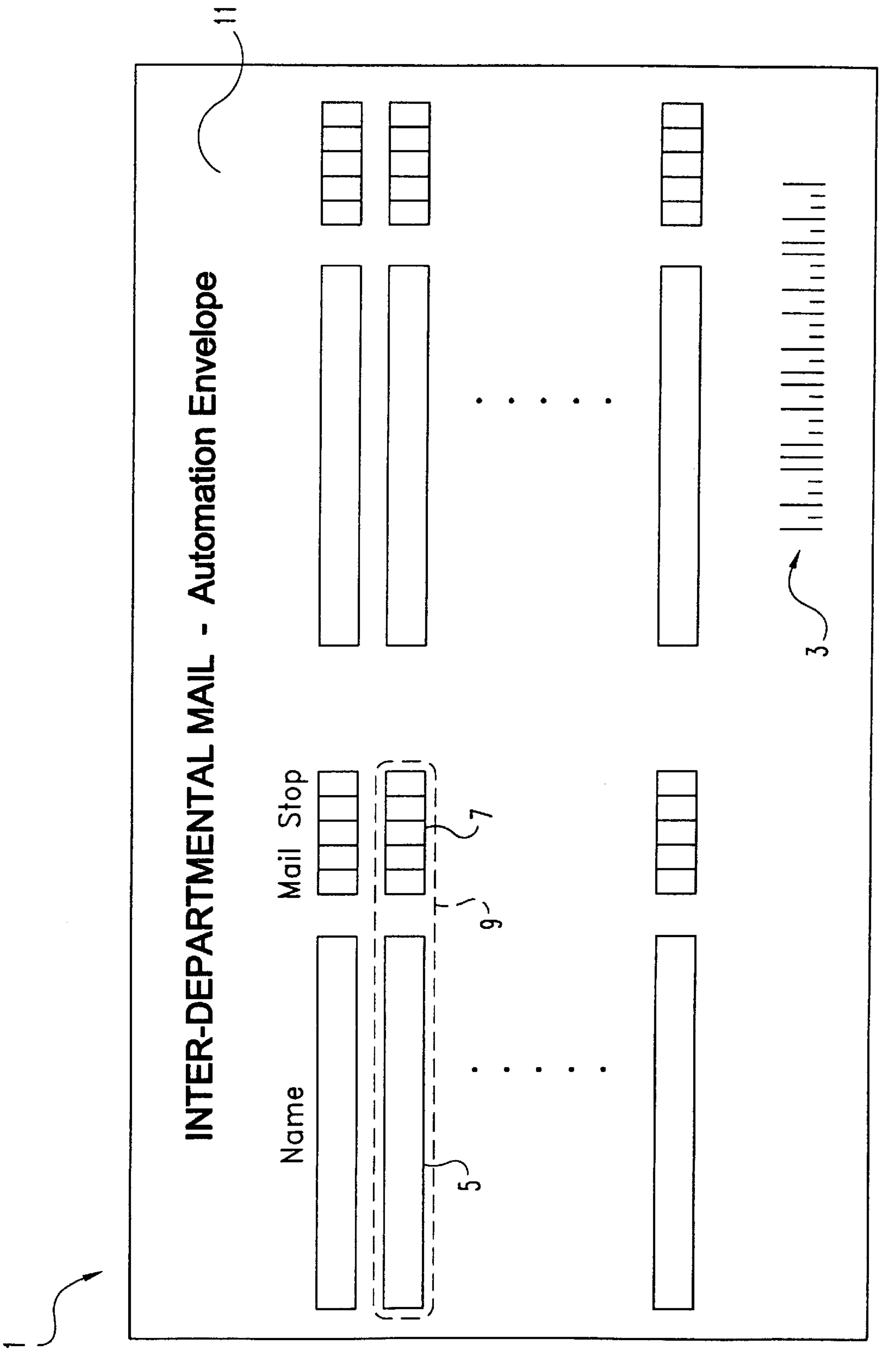
FIG. 1 is a front view of a typical reusable envelope which can be used with the present invention.

For the purposes of promoting an understanding of the principles of the invention, reference will now be made to the embodiments illustrated in the drawings, and specific language will be used to describe the same. It will, nevertheless, be understood that no limitation of the scope of the invention is thereby intended. Any alterations and further modifications in the described embodiments and any further applications of the principles of the invention as described herein are contemplated as would normally occur to one skilled in the art to which the invention relates.

FIG. 1 illustrates a reusable inter-departmental mail envelope 1 according to one embodiment of the present invention. Envelope 1 includes mail carrier identifier 3. For the illustrated example, identifier 3 is in the form of a bar code in the lower right corner of envelope 1. While bar code printers and readers are common and well known in the mail processing industry, any machine-readable identifier may be used with the present method and system. For example, a s2-dimensional bar code (see, for example, U.S. Pat. No. 5,298,731), circular encoding pattern (see, for example, U.S. Pat. No. 3,553,438), smart device, RF tag, magnetic strip, or any other machine-readable encoding method may be used.

The present description will be given in terms of envelopes, but flats and/or reusable parcel routing labels are but a few examples of items that could be used equally well in a system according to the present invention.

The identifying information in identifier 3 should be unique relative to the information provided by identifier 3 of any other mail carriers in the same mail processing system at the same time; however, when an envelope or parcel router is removed from the system, its identifying information may be reused by a different mail carrier. Envelopes 1 may be manufactured with identifier 3 indelibly printed thereon, with anti-smudge or clear plastic coating thereon, to name but a few variations.

A plurality of name entry spaces 5, each paired with a mail stop entry space 7 to form a destination slot 9, appears in the present example in two columns per side 11 of envelope 1. When a user of the system wishes to direct materials to another person within their organization, she selects an unused destination slot 9, writes the recipient's name in a recipient entry space 5, and writes the recipient's mail stop one character per block in the corresponding mail stop entry space 7. Destination slots 9 may be used in a specified sequence (for example, top to bottom in the left column, then top to bottom in the right column), but the present invention is suited as well to a system allowing senders to use destination slots 9 in random order. In one embodiment, envelope 1 may be provided in a form that includes the identifier 3 before any of its destination slots 9 are filled-in.

In other embodiments, identifier 3 may be added to envelope 1 at some point after one or more of the destination slots 9 are filled-out.

Figure 2:
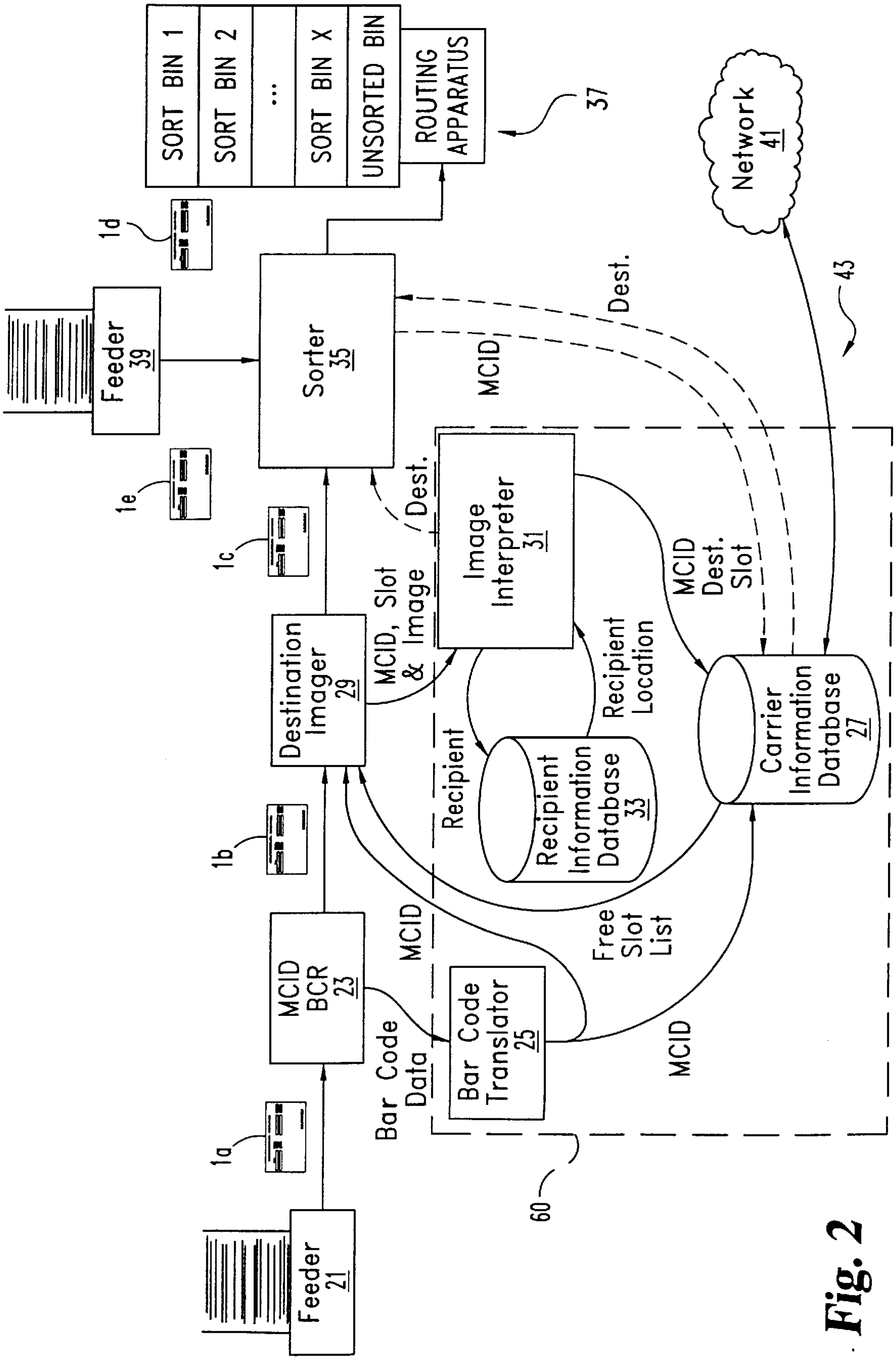
FIG. 2 is a block diagram of an installation for sorting mail in accordance with the present invention.

FIG. 2 describes a mail processing installation 43 adapted to process the envelope shown in FIG. 1 consistently with the principles of the present invention. Representative mail pieces are shown at various positions in the system as envelopes 1*a*, 1*b*, 1*c*, 1*d*, 1*e*, and 1*f* (see FIG. 3). It should be appreciated that a plurality of mail pieces may typically be processed in installation 43 at the same time, with each being in various stages of processing. Any suitable singulation and transport methods may be used.

Further, each stage of processing may be implemented by redundant hardware operating in parallel, with transport and control modifications as might be apparent to those skilled in the art. Envelope 1 a may enter the relevant portion of the mail processing apparatus from an automatic feeder 21, a manual feeding mechanism, or any other entry point delivery mechanism. In one embodiment, feeder 21 may be of the type disclosed in commonly owned U.S. Pat. No. 5,790,429 to Baker et al. or U.S. Pat. No. 5,862,243 to Baker et al. Envelope 1*a* is transported to bar code reader ("BCR") 23, which examines identifier 3 to obtain the bar code data represented therein. BCR 23 transmits the bar code data to bar code translator 25, which translates identifier 3 into mail carrier identity information. The mail carrier identity information may be determined directly from the corresponding identifier 3 using standard techniques. Alternatively, the mail carrier identity information may be calculated from an identifier input that is encoded with a mathematical checksum (for example, adding the decimal digits in a mail carrier serial number modulo 10 to yield a check digit, which is appended to the serial number), a hashing function, and/or other securing or error detection technique as would occur to one skilled in the art. In one embodiment, mail carriers from other enterprises with identity information that does not conform to the established coding technique may be detected and rejected from further processing. For other embodiments, security and/or error detection encoding may not be used, nonconforming mail carriers may be handled differently, or a combination of different identifier 3 formats may be utilized.

In one embodiment, carrier information database 27 maintains a record of which destination slots 9 have been used on envelope 1*b*. When bar code translator 25 determines the identity of envelope 1*b*, bar code translator 25 queries carrier information database 27 using the mail carrier identity information to yield a list of previously unused destination slots 9 on envelope 1*b*. Bar code translator 25 also sends the mail carrier identity information to destination imager 29. The results of the query are provided to destination imager 29 to reduce the number of destination slots 9 that must be examined (see below). (In another embodiment, mail carrier identity information is forwarded to destination imager 29 with the query results, so that the identity information does not have to be sent be bar code translator 25.)

In another embodiment, destination slots 9 are used in a predefined sequence. In that case, carrier information database 27 may store the number of destination slots 9 that have been used, which information may inform destination imager 29 as to which destination slot 9 the current address should be in.

In yet another embodiment, destination slots 9 must again be used in a particular sequence. Carrier information database 27 does not maintain "used slot" information, but destination imager 29 scans envelope 1 to find the last entry thereon.

It should be noted that bar code translator 25 may be integrated in a single device with BCR 23 and/or controller 60 (see below).

Envelope 1*b* is then transported to destination imager 29. Destination imager 29 scans envelope 1*b* based on the information received from carrier information database 27 to determine in which destination slot 9 the sender has written the current recipient's name and mail stop. In one example, the first previously unused slot 9 (as flagged in the free slot list from carrier information database 27) that is found by destination imager 29 to be occupied is taken as the source of the current address. In another example, previously used slots 9 (as indicated by a used slot count from carrier information database 27) are skipped, and the next slot 9 is taken as the source of the current address. A low resolution pre-scanner (not shown) may be used before destination imager 29 to determine which destination slots 9 contain markings, thereby further narrowing the possible destination slots 9 in which the sender may have written recipient information. Destination imager 29 obtains a digital image of that destination slot 9 and transmits it to image interpreter 31 with the number of the slot from which the image came.

Image interpreter 31 processes the destination image to determine the name and mail stop of the current intended recipient. This may be done using traditional OCR techniques, or any other information recognition technique (for example, "FieldScript" software from ParaScript, LLC, which has a place of business at 7105 La Vista Place, Niwot, Colo. 80503, USA). In one embodiment, image interpreter 31 may query recipient information database 33 with the detected recipient name to find the current mail stop for that individual, if available. This process may be used to properly route mail where, for example, an outdated location for a recipient is indicated, or a recipient is named who has left the organization. If the result from image interpreter 31 is assigned a low level of confidence, or if the recipient name is absent from recipient information database 33, then image interpreter 31 may query recipient information database 33 with both results of the image analysis (i.e., recipient name and location) to determine the location to which the mail piece was most likely intended to go. Alternatively, such mail pieces may be rejected and hand-processed, or the destination mail stop may be entered using a keypad, "video encoding," and/or "voice encoding" (see commonly owned, co1 pending application of Baker et al., filed of even date with the present application, entitled "MAIL PROCESSING SYSTEMS AND METHODS," which is hereby incorporated by reference in its entirety).

In another embodiment (not shown), recipient entry spaces 5 are omitted from envelopes 1. In this case, recipient information database 33 is not queried to correlate recipient names with mail stops. Recipient information database 33 may be omitted, or it may be queried by image interpreter 31 to validate the mail stop information in mail stop entry space 7 as read by destination imager 29 and interpreted by image interpreter 31.

When the destination for envelope 1*b* has been determined, image interpreter 31 forwards the identifier 3, current destination, and current destination slot to carrier information database 27, which updates its records of information regarding envelope 1*b* accordingly. As it is transported to sorter 35 as envelope 1*c*, image interpreter 31 may transmit to sorter 35 destination or routing information concerning envelope 1*c*.

Sorter 35 accepts mail pieces from destination imager 29 and feeder 39, and sorts them into X bins 37 for distribution or further processing as described below.

Figure 4:
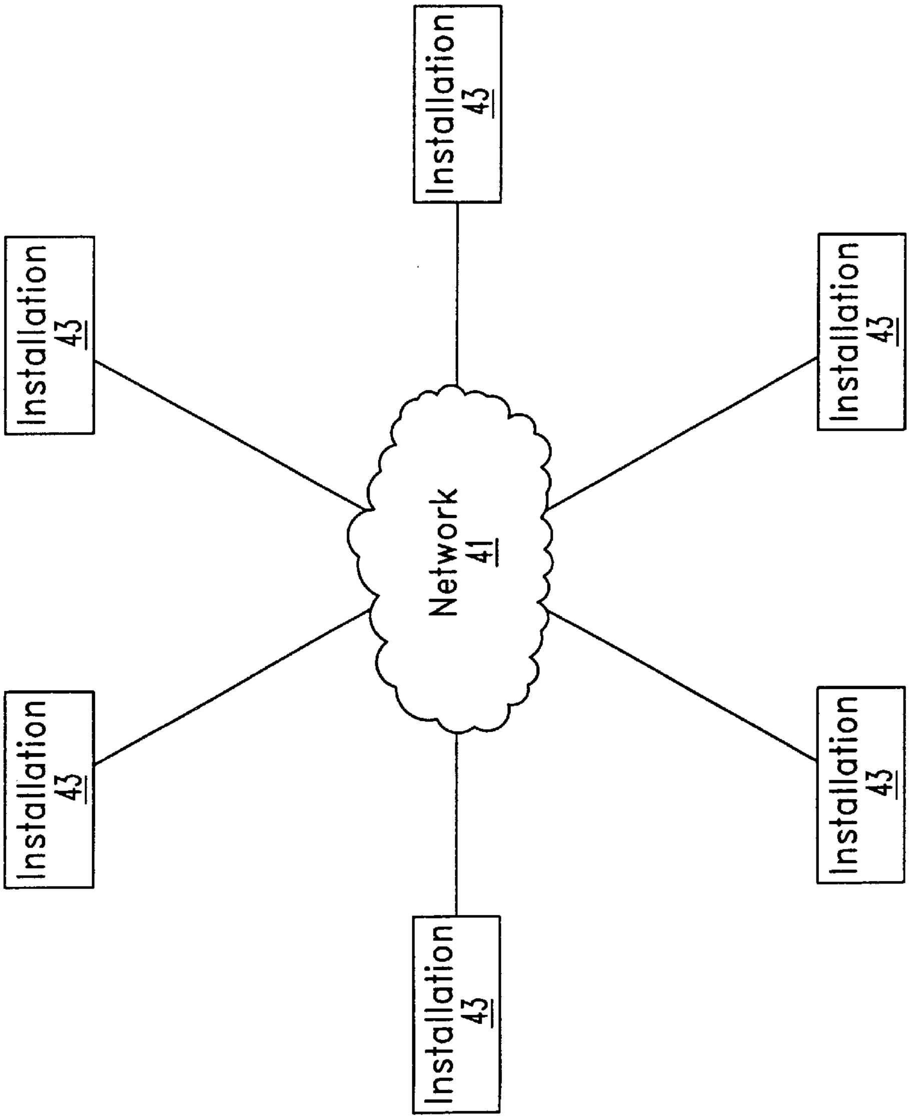
FIG. 4 is a diagram of the network topography of an enterprise-wide internal mail distribution system according to the present invention.

At convenient times, carrier information database 27 connects to corresponding databases 27 at other installations 43 (see FIG. 4) via network 41, so that the carrier information database 27 at each installation 43 contains the destination information necessary to route and/or deliver all mail pieces 1 at its installation 43, including those transported to its installation 43 from other installations 43 in the system. Network 41 may be any type of computer network including a local area network (LAN), a wide area network (WAN), or the Internet, to name just a few. Any suitable communications protocol may be used, including for example TCP/IP. FIG. 4 illustrates one possible network topography network 41 and installations 43. While a star topography is illustrated, a ring topography or other network topography may be used, as will be appreciated by those skilled in the art. In the star topography illustrated, each installation 43 is connected to network 41, enabling it to communicate with each other installation 43 as necessary to complete database updates as described above. In an alternative embodiment, only a single installation 43 may be utilized which would not require network 41 or the synchronizing of multiple carrier information databases 27.

Figure 3:
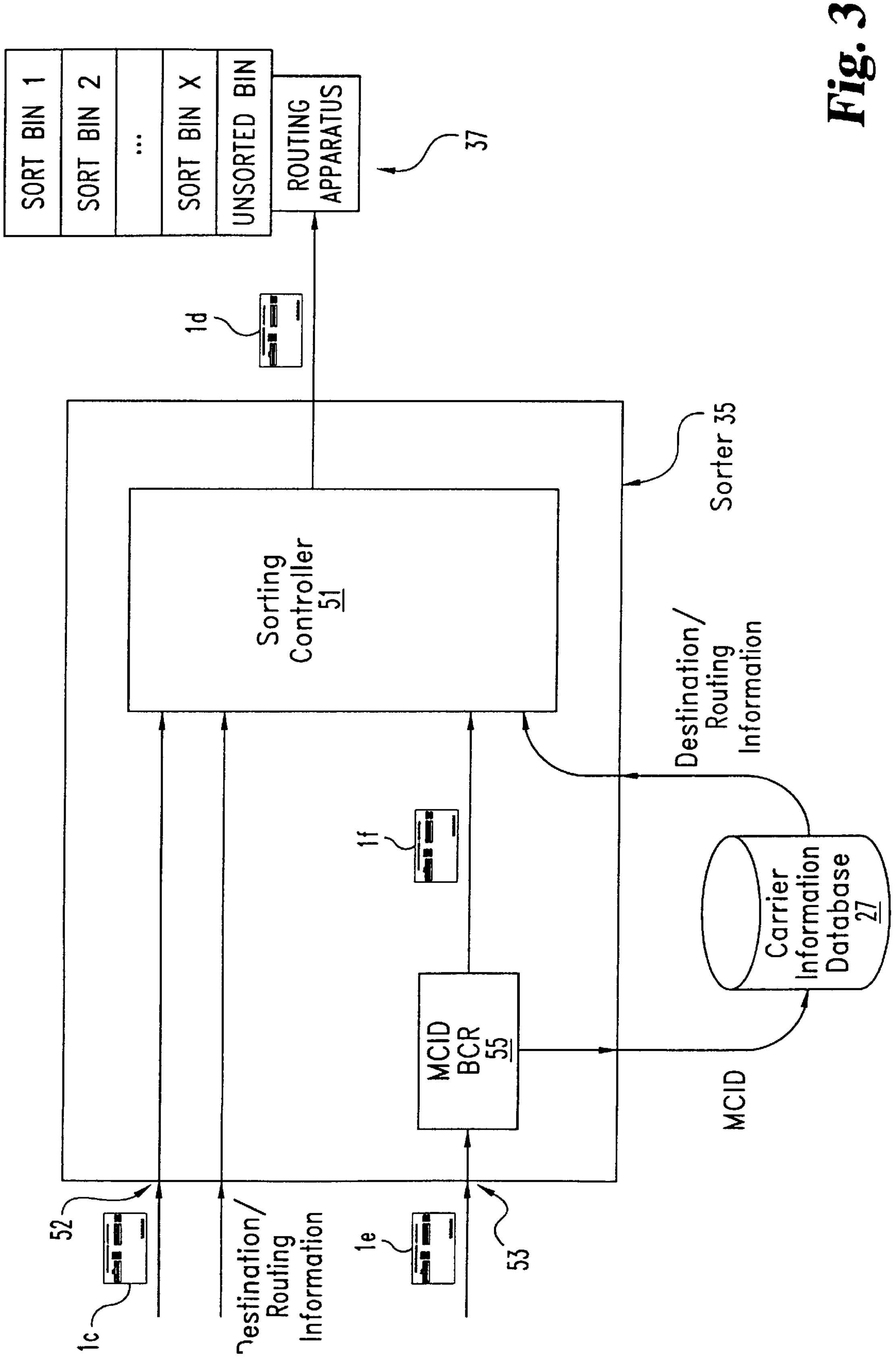
FIG. 3 is a block diagram of a sorter and controller for use within the present invention.

FIG. 3 further details selected aspects of sorter 35 for one embodiment of the present invention. In this exemplary embodiment, envelope 1*c* may enter sorter 35 at first sorter input 52 directly from destination imager 29 (shown in FIG. 1). In this case, destination or routing information may arrive from image interpreter 31 at about the same time as the envelope 1 c arrives for processing. Sorting controller 51 accepts envelope 1*c* and sends it as envelope 1*d* to an appropriate bin 37 for delivery or further processing.

Alternatively, envelope 1*e* may enter second sorter input 53 from another location within the routing and delivery system. Identifier BCR 55 accepts envelope 1*e* and reads its identifier 3. While the envelope is transported to sorting controller 51 as envelope 1*f*, carrier information database 27 is queried with the identifier to retrieve destination or routing information for envelope 1*f*. Sorting controller 51 then passes envelope 1*f* to the appropriate bin 37 based on the destination or routing information.

In a very large organization, thousands of internal mail pieces may arrive in a mail room together for processing. As each mail piece enters the system, its identifier 3 and destination are determined. Sorter 35 may provide an initial sort of each mail piece according to the city or building of its destination. Mail pieces bound for other installations 43 may then be transported by courier as appropriate.

Mail pieces to be delivered within the same installation 43 (or received form other installations 43) may be further processed as is known in the art (for example, using multi-pass sorting procedures), bypassing the destination imaging and interpretation process during subsequent sorts. Because the destination information is stored in carrier information database 27 upon the entrance of the mail piece to the system, subsequent sorting and routing operations may use the stored destination information in carrier information database 27. A second pass on the envelopes from a selected bin of the first pass may sort the pieces according to the department of their destination, with a third pass on each output bin being used to further sort according to specific delivery locations within that department. Any method for sorting and routing mail pieces may be used, including for example those shown in U.S. Pat. Nos. 5,009,321; 5,353,938; and 5,901,855.

In other embodiments, imaging and interpretation of destinations may be done using other means known in the art, including for example portable scanners, manual data entry techniques, video encoding, or voice encoding.

Figure 5:
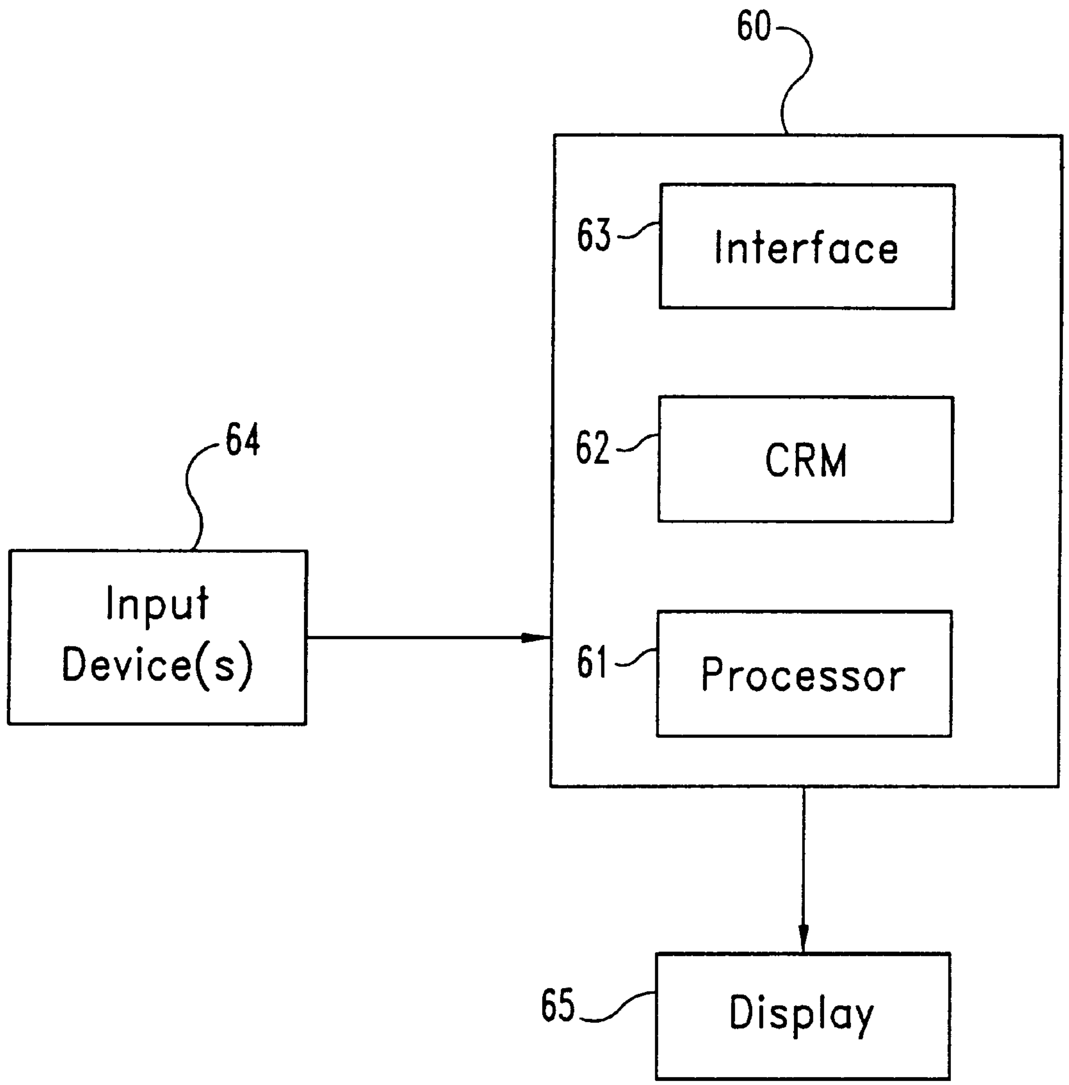
FIG. 5 is a block diagram of a control device suitable for use with one embodiment of the present invention.

FIG. 5 shows control device 60 according to one embodiment of the present invention. Control device 60 includes processor 61, memory 62, and interface 63; and is coupled to one or more input devices 64 and display 65. Processor 61 may be comprised of one or more components configured as a single unit. Alternatively, when of a multi-component form, processor 61 may have one or more components remotely located relative to the others, or otherwise have its components distributed throughout installation 43. Processor 61 may be programmable, a state logic machine, or other type of dedicated hardware, or a hybrid combination of programmable and dedicated hardware. One or more components of processor 61 may be of the electronic variety, including digital circuitry, analog circuitry, or both. As an addition or alternative to electronic circuitry, processor 61 may include one or more mechanical, hydraulic, pneumatic, or optical control elements.

In one embodiment including electronic circuitry, processor 61 has an integrated processing unit operatively coupled to one or more solid-state devices that comprise, at least in part, memory 62. These memory devices contain programming to be executed by the processing unit and are arranged for reading and writing of data in accordance with one or more routines executed by processor 61. Besides memory, processor 61 may include any oscillators, control clocks, interfaces, signal conditioners, filters, limiters, analog-to-digital ("A/D") converters, digital-to-analog ("D/A") converters, communication ports, or other types of circuits as would occur to those skilled in the art to implement the present invention.

Control device 60 includes processor 61, memory 62, and interface 63, and is operatively coupled to feeder 21, BCR 23, bar code translator 25, destination imager 29, image interpreter 31, recipient information database 33, carrier information database 27, sorter 35, feeder 39, and routing apparatus 37. In one embodiment, two or more of these items may be integrated in a single device. Processor 61 may also be operatively coupled to one or more input devices 64 and display 65 to facilitate operator control over the installation 43.

Display 65 may be of the cathode ray tube ("CRT") type, a liquid crystal type, or other type as would occur to those skilled in the art. Input device(s) 64 may include one or more of a keyboard, mouse, microphone, or other type of input device as would occur to one skilled in the art. Although not shown, besides display 65, another output device such as a printer may be operatively coupled to processor 61. Processor 61 is interfaced with other components in installation 43 as necessary or desirable to coordinate feeding, transport, scanning, converting, querying, responding, and/or sorting operations at installation 43. The functions of bar code translator 25, image interpreter 31, and databases 27, 30 may optionally be implemented within control device 60. In one embodiment, control device 60 is configured as a standard personal computer unit based on a PENTIUM central processing unit supplied by Intel Corporation having a business address of 2200 Mission College Blvd., Santa Clara, Calif. 95052, USA. For this embodiment, control device 60 utilizes the WINDOWS NT operating system supplied by Microsoft Corporation, having a business address of One Microsoft Way, Redmond, Wash. 98052-6399, USA.

Memory 62 may include one or more types of electronic memory that are alternatively or additionally of the solid-state, magnetic, and/or optical variety. For example, memory 62 may include solid-state electronic Random Access Memory (RAM), Sequential Accessible Memory (SAM) (such as the First-In, First-Out (FIFO) variety, or the Last-In, First-In LIFO variety), Programmable Read Only Memory (PROM), Electrically Programmable Read Only Memory (EPROM), or Electrically Erasable Programmable Read Only Memory (EEPROM); an optical disc memory (such as a CD ROM); a magnetically encoded hard disc, floppy disc, tape, or cartridge media; another variety of computer readable medium or media as would occur to those skilled in the art, or a combination of any of these types. Furthermore, memory 62 may be volatile, nonvolatile, or a hybrid combination of volatile and nonvolatile varieties. Also, memory 62 may be permanently installed in device 60, in a portable form that may be readily removed and reinstalled, or a combination of these types. Interface 63 may be of a standard type suitable for communication with the corresponding network(s), controllers, and processors to which it is connected.

In another embodiment of the present invention (not shown), destination slots 9 are omitted from envelope 1. As envelope 1 enters the mail processing system, its intended destination is stored in carrier information database 27; for example, as input by the sender at a computer terminal. Envelope 1 may then be routed through the mail processing system based on the stored destination information as described above in relation to FIGS. 2–5. Such a system may be more secure than the other embodiments described above, in that those handling mail pieces as they travel through the system cannot read the current or prior destinations for each mail piece as it is processed.

All publications, patents, and patent applications cited in this specification are herein incorporated by reference as if each individual publication, patent, or patent application was specifically and individually indicated to be incorporated by reference and set forth in its entirety herein. While the invention has been illustrated and described in detail in the drawings and foregoing description, the same is considered to be illustrative and not restrictive in character, it is understood that only the preferred embodiments have been shown and described and that all changes, modifications, and equivalents that come within the spirit of the invention as defined by the following claims are desired to be protected.

What is claimed is:

1. A method comprising:

providing a reusable mail carrier with a machine-readable mail carrier identifier;

obtaining first destination information for the mail carrier;

associating the mail carrier identifier and the first destination information;

routing the mail carrier according to the first destination information;

obtaining second destination information for the mail carrier;

associating the mail carrier identifier with the second destination information; and routing the mail carrier according to the second destination information.

2. The method of claim 1, wherein:

said obtaining the first destination information comprises reading the first destination information from a first location on the mail carrier; and said obtaining the second destination information comprises reading the second destination information from a second location on the mail carrier.

3. The method of claim 1, wherein the machine-readable mail carrier identifier is a bar code.

4. The method of claim 1, wherein said obtaining the first destination information comprises:

scanning the mail carrier to create destination image data; and performing character recognition on the destination image data to derive the destination information.

5. The method of claim 1, wherein said obtaining the first destination information comprises keying all or part of the destination information into an electronic device.

6. The method of claim 1, wherein said routing comprises:

reading the mail carrier identifier;

querying a database based on the mail carrier identifier; and sorting the mail carrier based on the results of said querying.

7. The method of claim 1, wherein said obtaining the first destination information comprises:

reading a recipient name from said mail carrier;

reading a delivery location from said mail carrier;

querying a recipient location database to generate a current recipient location; and taking the current recipient location as the destination information obtained.

8. The method of claim 1, wherein said obtaining the first destination information comprises:

reading a recipient name from said mail carrier;

reading a delivery location from said mail carrier;

querying a recipient location database to generate a current recipient location; and indicating an error if the delivery location and the current recipient location are different.

9. The method of claim 1, wherein said associating the mail carrier identifier and the first destination information includes storing the first destination information in a database distributed in a plurality of locations, the plurality of locations being connected by one or more communications networks.

10. A reusable mail carrier in a mail delivery system, comprising:

a machine-readable mail carrier identifier, which identifies the mail carrier as different from any other mail carrier in the mail delivery system; and a plurality of destination entry blocks, each suitable for the entry of information identifying a destination.

11. The reusable mail carrier of claim 10, wherein only blank destination entry blocks are initially provided on the mail piece with the mail carrier identifier.

12. The reusable mail carrier of claim 10, wherein said mail carrier identifier comprises identity data; and check data.

13. The reusable mail carrier of claim 10, wherein said check data comprises a mathematical checksum applied to at least a portion of said identity data.

14. The reusable mail carrier of claim 10, wherein said check data comprises the result of a hashing function applied to at least a portion of said identity data.

15. An apparatus, comprising: computer readable medium encoded with programming instructions for a processor coupled to one or more input devices and a mail sorter, comprising a database maintenance routine for a processing system for reusable mail carriers, each said carrier having an identity, said programming instructions being executable to:

maintain a database of mail carrier identities and corresponding current destination information;

accept a query signal related to a mail carrier identity;

generate a response signal related to the current destination information, in response to the query signal; and update said database when a mail carrier is reused.

16. An apparatus encoded with programming instructions for a processor coupled to one or more input devices and an internal mail sorter, said programming instructions being executable to:

determine a current desired destination from a plurality of destination locations on a reusable mail carrier, the plurality of destinations being input with the one or more input devices;

maintain a database relating an identifier for the reusable mail carrier to the current desired destination locations; and generate a sorting signal to direct the internal mail sorter to sort the reusable mail carrier.

17. The apparatus of claim 16, wherein said programming instructions are further executable to respond to input of an identification signal used to uniquely designate a mail container.

18. The apparatus of claim 16, wherein said database is distributed across a plurality of locations.

* * * * *